(12) United States Patent
Sato

(10) Patent No.: US 9,020,340 B2
(45) Date of Patent: Apr. 28, 2015

(54) OPTICAL PACKET SWITCHING SYSTEM

(75) Inventor: Reiko Sato, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 139 days.

(21) Appl. No.: 13/542,389

(22) Filed: Jul. 5, 2012

(65) Prior Publication Data

US 2013/0039650 A1 Feb. 14, 2013

(30) Foreign Application Priority Data

Aug. 9, 2011 (JP) ................................. 2011-173887

(51) Int. Cl.
*H04B 10/079* (2013.01)
*H04Q 11/00* (2006.01)
*H04J 14/02* (2006.01)

(52) U.S. Cl.
CPC ......... *H04Q 11/0005* (2013.01); *H04J 14/0212* (2013.01); *H04J 14/0275* (2013.01); *H04Q 2011/0039* (2013.01); *H04Q 2011/0049* (2013.01)

(58) Field of Classification Search
USPC ............................................... 398/26, 30, 37
See application file for complete search history.

(56) References Cited

U.S. PATENT DOCUMENTS

| 5,513,029 A | * | 4/1996 | Roberts | ........................... 398/32 |
| 6,271,945 B1 | * | 8/2001 | Terahara | ......................... 398/26 |
| 2006/0274778 A1 | * | 12/2006 | Currivan et al. | .............. 370/445 |

FOREIGN PATENT DOCUMENTS

JP 2008-235986 10/2008

* cited by examiner

*Primary Examiner* — Nathan Curs
(74) *Attorney, Agent, or Firm* — Christie, Parker & Hale, LLP

(57) ABSTRACT

An optical packet switching system includes a plurality of network elements for transmitting and receiving optical packet signals. Each network element includes an optical signal-to-noise ratio (OSNR) acquiring unit for acquiring the OSNR of each optical packet signal, an average value calculating unit for calculating the average value of the OSNRs of optical packet signals received within a predetermined time duration for each of the plurality of source network elements, and a difference information transmitter for calculating the difference between the calculated average value of the OSNRs and a target value of the OSNRs and then transmitting the difference to a network element corresponding to the difference. A source network element that has received the difference information adjusts the characteristics of an optical packet signal to be transmitted in a manner such that the difference is reduced.

6 Claims, 11 Drawing Sheets

OPTICAL PACKET SWITCHING SYSTEM

CROSS-REFERENCE TO RELATED APPLICATION

This application claims priority to and the benefit of Japanese Patent Application Number 2011-173887, filed on Aug. 9, 2011, the entire disclosure of which is incorporated herein by reference.

BACKGROUND OF THE INVENTION

1. Field of the Invention

The present invention relates to an optical packet switching system that enables packet switching for each optical packet.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

In the optical packet switching scheme, the optical packets transmitted from a given network element are switched by a plurality of network elements and then arrive at a destined network element. Optical packets arriving at a certain network element have been transmitted from various network elements and also have passed through different routes, and therefore these optical packets have varied optical signal-to-noise ratios (OSNRs), respectively. It is difficult for an optical receiver of a network element to properly receive the optical packet signals if the OSNR varies for each optical packet signal.

SUMMARY OF THE INVENTION

The present invention has been made in view of the foregoing circumstances, and a purpose thereof is to provide an optical packet switching system capable of suppressing the variation in the optical signal-to-noise ratio (OSNR) of the received optical packets.

In order to resolve the above-described problems, an optical packet switching system according to one embodiment of the includes a plurality of transmitting network elements for transmitting optical packet signals and a receiving network element for receiving the optical packet signals transmitted from the transmitting network elements. The receiving network elements includes: an optical signal-to-noise ratio (OSNR) acquiring unit configured to acquire an OSNR of each of the optical packet signals received; an average value calculating unit configured to calculate an average value of the OSNRs of optical packet signals received within a predetermined time duration for each of the plurality of transmitting network elements that are sources of the optical packet signals; and a difference information transmitter configured to calculate a difference between the calculated average value thereof and a target value of the OSNR for each of the plurality of transmitting network elements and configured to transmit the difference to a transmitting network element associated with the difference. Each of the transmitting network elements adjusts a characteristic of an optical packet signal to be transmitted in a manner such that the difference is reduced.

Each of the transmitting network elements may adjust the light power and/or extinction ratio of the optical packet signal.

The difference information transmitter may set the average value of the OSNRs of all of the optical packet signals received within the predetermined time duration, to the target value.

Each of the transmitting network elements may include an optical amplifier device for amplifying the optical packet signal, estimating the OSNR of the optical packet signal, and appending information on the estimated OSNR to the optical packet signal.

The optical amplifier device may estimate the OSNR of the optical packet signal to be outputted, based on the light power of the inputted optical packet signal and a noise figure of the optical amplifier device.

The optical amplifier device may convert the estimated OSNR information into an optical signal and insert the optical signal before or after the optical packet signal.

Each of the transmitting network elements may convey information on the OSNR to the receiving network element using an optical supervisory channel.

Optional combinations of the aforementioned constituting elements, and implementations of the invention in the form of apparatuses, methods, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Embodiments of the present invention will be hereinbelow described with reference to Drawings.

Figure 1:
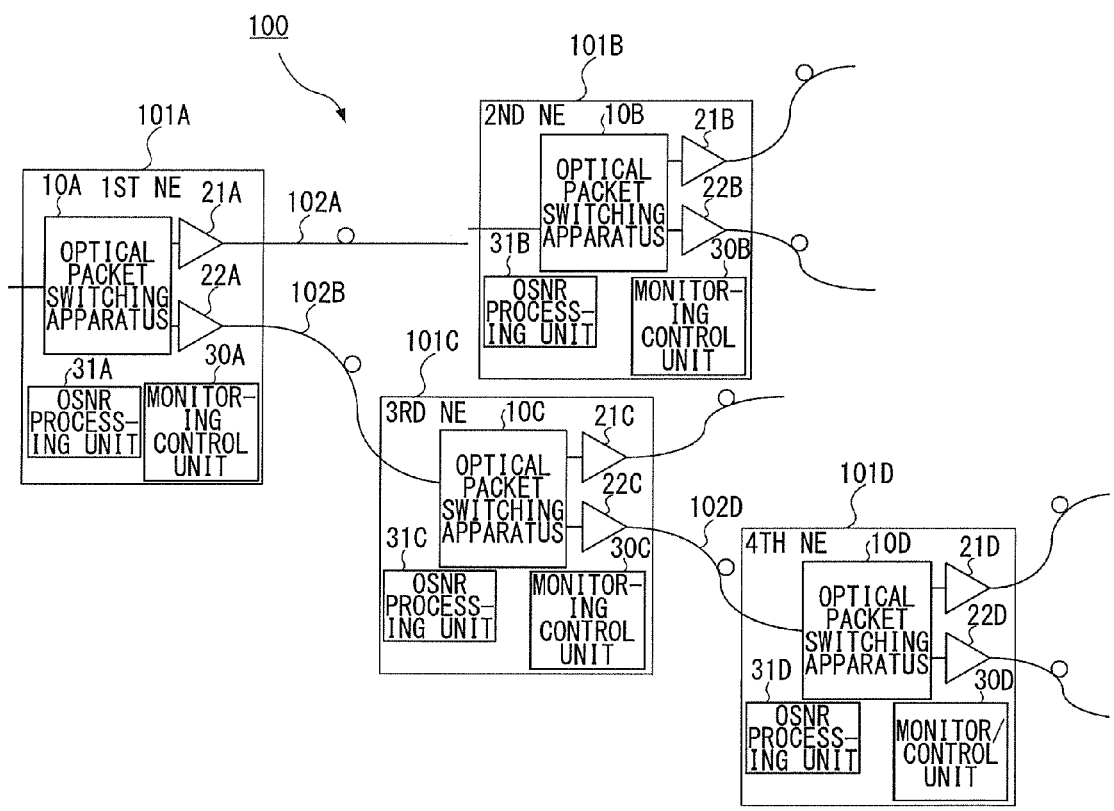
FIG. 1 is a diagram for explaining an optical packet switching system according to an embodiment of the present invention.

FIG. 1 is a diagram for explaining an optical packet switching system according to an embodiment of the present invention. As shown in FIG. 1, an optical packet switching system 100 includes first to fourth network elements (NEs) 101A to 101D. In the following description, the first to fourth network elements 101A to 101D may also be collectively or generically called "network element 101". Though, in the present embodiment, the optical packet switching system 100 has four network elements, the optical packet switching system 100 may actually have an arbitrary number of network elements.

The first to fourth network elements 101A to 101D, which are connected by optical fibers, constitute an optical packet network. More specifically, the first network element 101A and the second network element 101B are connected by an optical fiber 102A. The first network element 101A and the third network element 101C are connected by an optical fiber 102B. The third network element 101C and the fourth network element 101D are connected by an optical fiber 102D.

As shown in FIG. 1, the first to fourth network elements 101A to 101D includes optical packet switching apparatuses 10A to 10D, first optical amplifier devices 21A to 21D, second optical amplifier devices 22A to 22D, monitoring control units 30A to 30D, and optical signal-to-noise ratio (OSNR) processing units 31A to 31D.

Figure 2:
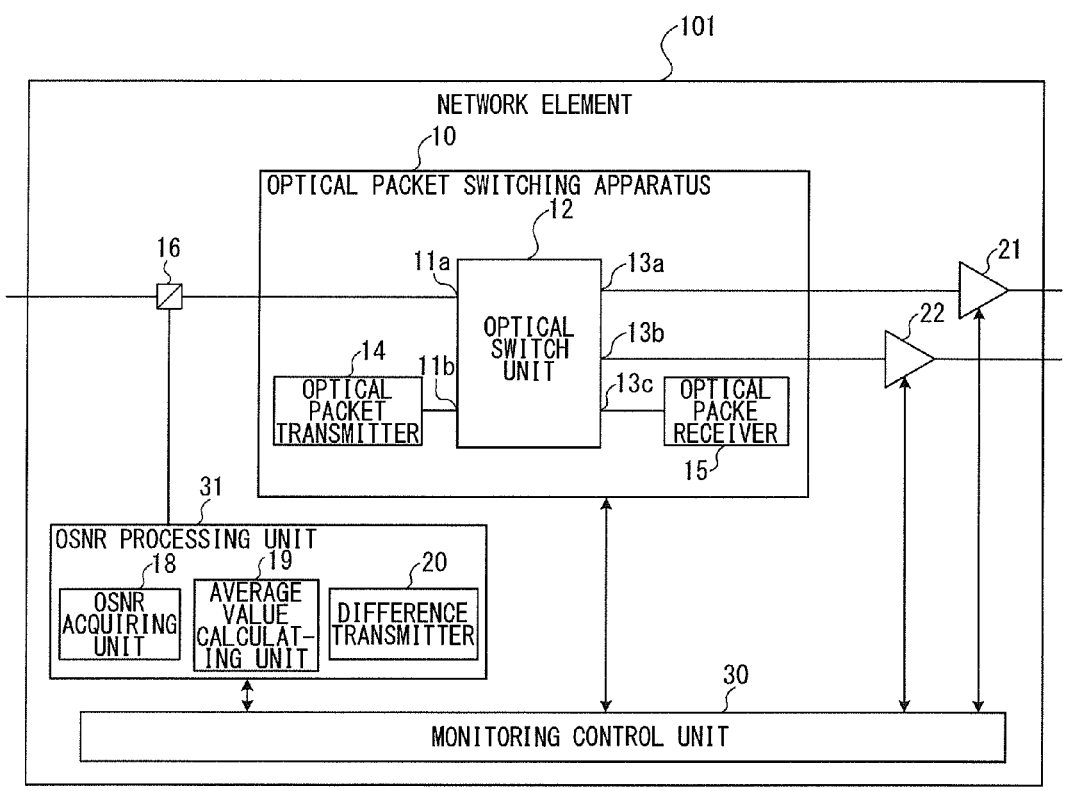
FIG. 2 shows a structure of a network element.

FIG. 2 shows a structure of a network element. As shown in FIG. 2, the network element 101 includes an optical packet switching apparatus 10, a first optical amplifier device 21, a second optical amplifier device 22, a monitoring control unit 30, an optical signal-to-noise ratio (OSNR) processing unit 31. The optical packet switching apparatus 10 includes an optical switch unit 12, an optical packet transmitter 14, an optical packet receiver 15, and an optical coupler 16.

The optical packet signal inputted to the network element 101 is bifurcated by the optical coupler 16. One of the branched-off optical packet signals is inputted to the optical switch unit 12 of the optical packet switching apparatus 10, whereas the other thereof is inputted to the OSNR processing unit 31.

The optical packet transmitter 14 receives a client signal from a client side. Then the optical packet transmitter 14 appends destination information, packet length information and the like to the client signal and thereby generates an optical packet signal. The optical packet signal outputted from the optical packet transmitter 14 is inputted to the optical switch unit 12.

The optical switch unit 12 is an optical switching device, with two inputs×three outputs, which switches the route of the inputted optical packet signals. The optical packet signals are inputted to a first input port 11a of the optical switch unit 12 from the optical coupler 16. Also, the optical packet signals are inputted to a second input port 11b of the optical switch unit 12 from the optical packet transmitter 14.

The optical switch unit 12 switches the path of the inputted optical packet signals and outputs them from any one of first to third output ports 13a to 13c. The optical packet signal outputted from the first output port 13a of the optical switch unit 12 is amplified by the first optical amplifier device 21 before it is outputted externally. Also, the optical packet signal outputted from the second output port 13b of the optical switch unit 12 is amplified by the second optical amplifier device 22 before it is outputted externally. Also, the optical packet signal outputted from the third output port 13c of the optical switch unit 12 is inputted to the optical packet receiver 15.

The optical packet receiver 15 restores the received optical packet signal to the original client signal and then outputs the restored signal to the client side.

The OSNR processing unit 31 includes an OSNR acquiring unit 18, an average value calculating unit 19, and a difference transmitter 20.

The optical packet signal is inputted to the OSNR acquiring unit 18 from the optical coupler 16. The OSNR acquiring unit 18 measures the optical signal-to-noise ratio (OSNR) for each optical packet signal received. The thus measured OSNR information is sent to the average value calculating unit 19 and the difference transmitter 20.

The average value calculating unit 19 calculates an average value of the OSNRs of optical packet signals received within a predetermined time duration for each of the network elements that are sources of the optical packet signals. The average value of the OSNRs for each source network element will be hereinafter referred to as "per-source average OSNR" also.

The difference transmitter 20 calculates the OSNRs of all of the optical packet signals received within the predetermined time duration. The average value of all of the optical packet signals will be hereinafter referred to as "overall average OSNR" also. The difference transmitter 20 calculates the difference between the per-source average OSNR and the overall average OSNR for each source network element, and the difference information is conveyed to the corresponding network element. The monitoring control unit 30 conveys the difference information thereto.

The monitoring control unit 30 monitors and controls the components inside the network element 101, namely, the optical packet switching apparatus 10, the first optical amplifier device 21, the second optical amplifier device 22, and the OSNR processing unit 31. Also, the monitoring control unit 30 communicates various items of information (including the difference information) using an optical supervisory channel (OSC) having a wavelength different from the wavelength used for the optical packet signals.

The monitoring control unit 30 receives the difference information transmitted from other network elements. The difference information received by the monitoring control unit 30 is sent to the optical packet transmitter 14. The optical packet transmitter 14, which has received the difference information, adjusts the characteristics of optical packet signals to be transmitted in a manner such that the difference is less than a preset threshold value. More specifically, the optical packet transmitter 14 adjusts the light power and/or extinction ratio of the optical packet signal in a manner such that the difference is reduced.

Figure 3:
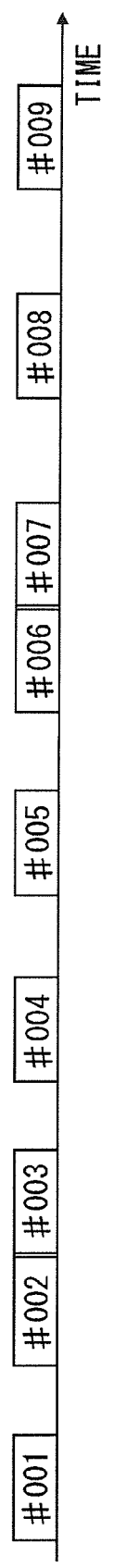
FIG. 3 shows optical packet signals that have arrived at network elements.

A description is now given of an operation of the optical packet switching system 100 according to the present embodiment. A description is given herein of an example, in conjunction with FIG. 3, where optical packet signals #1 to #9 outputted from the first network element 101A and the third network element 101C have arrived at the fourth network element 101D within a predetermined time duration.

Figure 4:
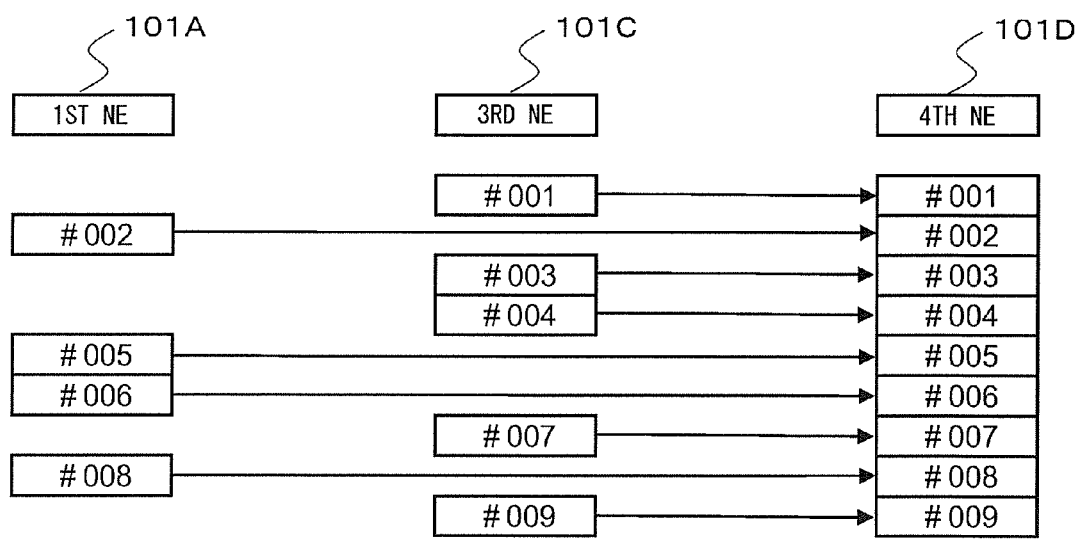
FIG. 4 is a diagram used to explain the route of each optical packet signal.

FIG. 4 is a diagram for explaining the route of each optical packet signal. FIG. 4 shows, for example, that the optical packet signal #001 is transmitted from the third network element 101C and then arrives at the fourth network element 101D. Also, FIG. 4 shows, for example, that the optical packet signal #002 is transmitted from the first network element 101A and then arrives at the fourth network element 101D after passing through the third network element 101C.

For example, the optical packet signals #001 and #002 are output packet signals outputted from the different optical packet transmitters, and the numbers of optical amplifier devices through which their respective optical packet signals have passed differ from each other. That is, the optical packet signal #001 passes through the second optical amplifier device 22A of the first network element 101A and the second optical amplifier device 22C of the third network element 101C. Also, the optical packet signal #002 passes through the second optical amplifier device 22C of the third network element 101C. Thus, the optical packet signal #001 and the optical packet signal #002 normally have different OSNR values. Where the variation in OSNR between the continuous optical packet signals #001 and #002 is large, it is difficult for the optical packet receiver of the optical packet switching apparatus 10D in the fourth network element 101D to properly receive the optical packet signals. In the light of this, the optical packet switching system 100 performs control in such a manner as to suppress the variation in OSNR.

Figure 5:
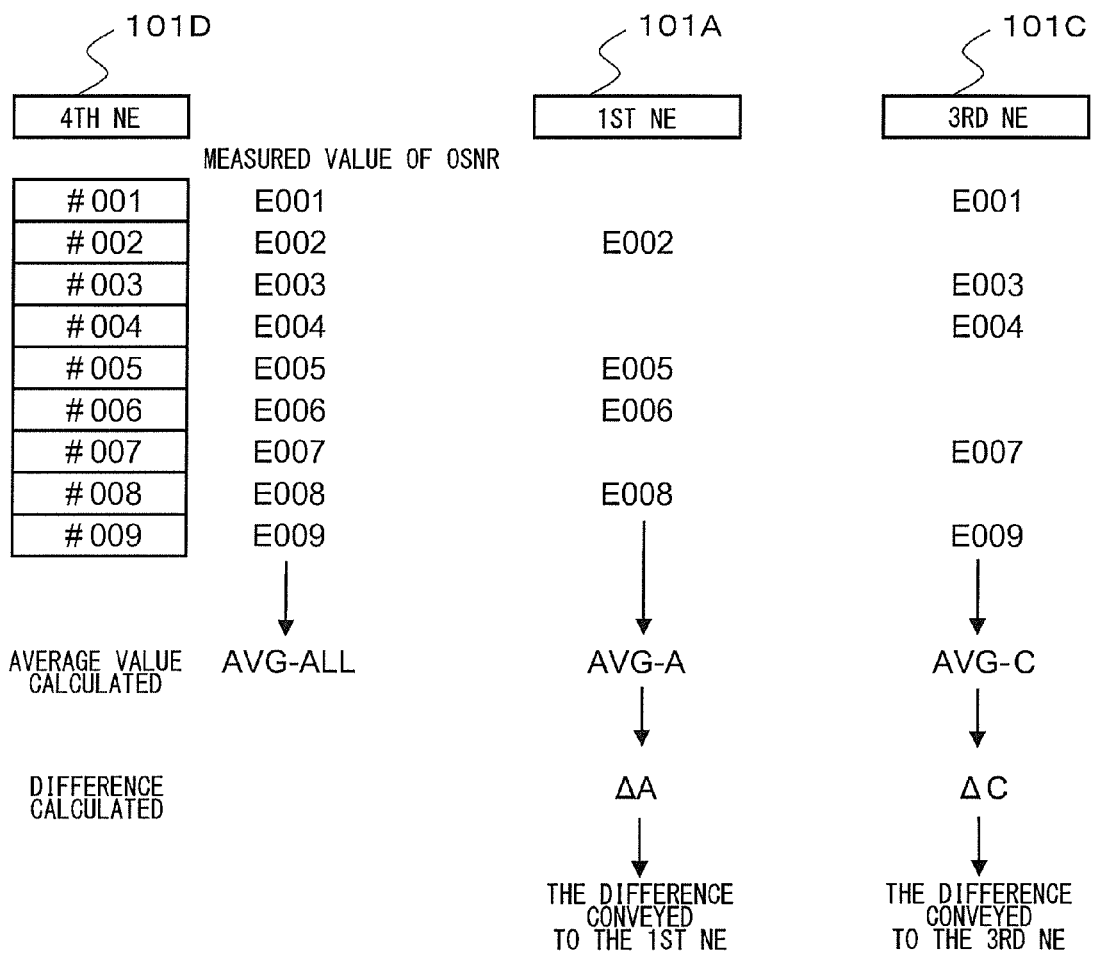
FIG. 5 is a diagram for explaining a control performed to suppress the variation in OSNR in an optical packet switching apparatus according to an embodiment.

FIG. 5 is a diagram for explaining a control performed to suppress the variation in OSNR in the optical packet switching apparatus according to the present embodiment. Similar to FIG. 3 and FIG. 4, considered here is a case where the optical packet signals #1 to #9 outputted from the first network element 101A and the third network element 101C have arrived at the fourth network element 101D within a predetermined time duration.

The OSNR acquiring unit 18 of the ONSR processing unit 31D in the fourth network element 101D measures the OSNRs of the optical packet signals #001 to #009 that have arrived at the fourth network element 101D. The OSNRs E001 to E009 of the respective optical packet signals #001 to #009 measured by the OSNR acquiring unit 18 are sent to the average value calculating unit 19 and the difference transmitter 20.

The average value calculating unit 19 calculates the an average value of the OSNRs of the optical packet signals #001 to #009 with respect to each optical network element which is the source of each optical packet signal. In the example of FIG. 5, the source of the optical packet signals #002, #005, #006 and #008 are the first network element 101A and therefore the average value AVG-A (per-source average OSNR) of the OSNRs E002, E005, E006 and E008 of these optical packet signals is calculated. Also, the source of the optical packet signals #001, #003, #004, #007 and #009 are the third network element 101C and therefore the average value AVG-C (per-source average OSNR) of the OSNRs E001, E003, E004, E007 and E009 of these optical packet signals is calculated.

The difference transmitter 20 calculates the average value AVG-ALL (overall average OSNR) of all of the optical packet signals #001 to #009. Then the difference transmitter 20 calculates a difference ΔA between the AVG-A and the AVG-ALL for the first network element 101A and conveys the difference ΔA to the first network element 101A. Also, the difference transmitter 20 calculates a difference ΔC between the AVG-C and the AVG-ALL for the third network element 101C and conveys the difference ΔC to the third network element 101C. As described above, the differences ΔA and ΔC are conveyed using the optical supervisory channel.

The optical packet transmitter 14 of the optical packet switching apparatus 10A in the first network element 101A that has been notified of the difference ΔA adjusts the light power and/or extinction of an optical packet to be transmitted in a manner such that the difference ΔA is smaller than a predetermined threshold value.

Similarly, the optical packet transmitter 14 of the optical packet switching apparatus 100 in the third network element 101C that has been notified of the difference ΔC adjusts the light power and/or extinction of an optical packet to be transmitted in a manner such that the difference ΔC is smaller than a predetermined threshold value.

By performing control as described above, the variation in OSNR of an optical packet signal inputted to the fourth network element 101D is suppressed, so that the optical packet signals can be suitably received.

In the above description, the first network element 101A and the third network element 101C are transmitting network elements, whereas the fourth network element 101D is receiving network element. However, this should not be considered as limiting and any of the network elements may be either a transmitting network element or a receiving network element.

In the present embodiment, the difference transmitter 20 calculates the difference between the per-source average OSNR and the overall average OSNR. In a modification of the present embodiment, the difference transmitter 20 may calculate the difference between the per-source average OSNR and a predetermined target value. In this modification, the OSNR of an optical packet signal inputted to a receiving network element is brought closer to the predetermined target value, so that the variation in OSNR can be suppressed.

An optical packet signal transmitted by each network element may be a wavelength-multiplexed optical packet signal. In such a case, the above-described control of suppressing the variation in OSNR may be performed for each wavelength.

Figure 6:
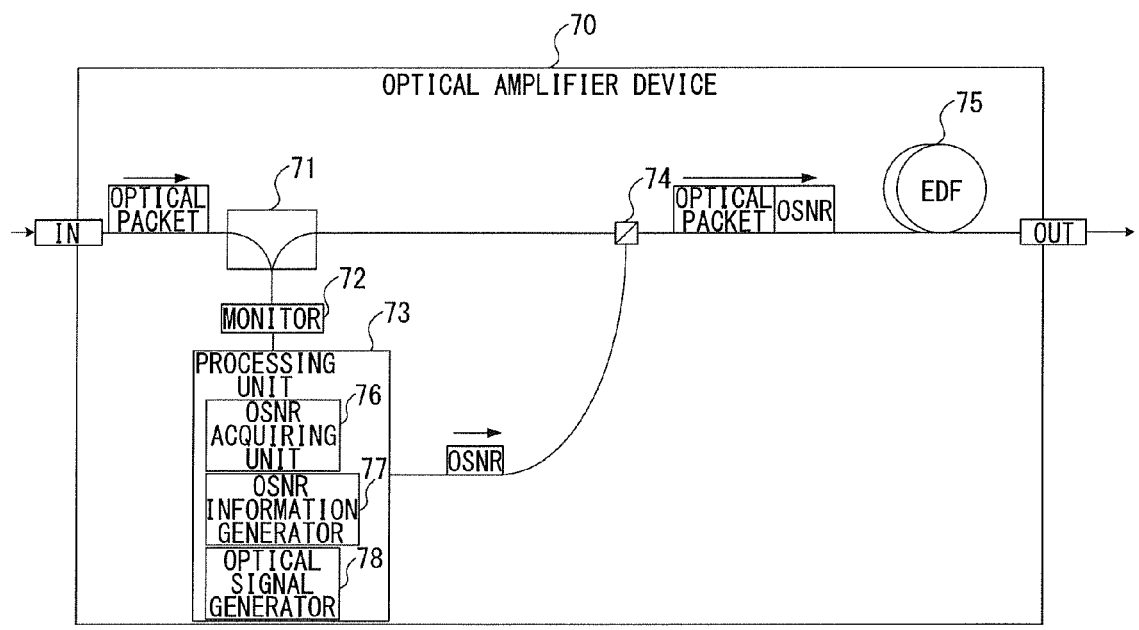
FIG. 6 is a structure of an optical amplifier device.

FIG. 6 is a structure of an optical amplifier device. An optical amplifier device 70 as shown in FIG. 6 may be installed inside a network element, for instance. The optical amplifier device 70 can append the OSNR information to the optical packet signal. Use of the optical amplifier device in the optical packet switching system enables facilitating the acquisition of OSNRs.

As shown in FIG. 6, the optical amplifier device 70 includes a first optical coupler 71, a monitor 72, an OSNR processing unit 73, a second optical coupler 74, and an erbium doped fiber (EDF) 75.

The optical packet signal inputted to the optical amplifier device 70 is bifurcated by the first optical coupler 71. One of the branched-off optical packet signals is sent to the second optical coupler 74, whereas the other thereof is sent to the monitor 72. The monitor 72 detects the light power of the other thereof inputted.

The OSNR processing unit 73 includes an OSNR acquiring unit 76, an OSNR information generator 77, and an optical signal generator 78. The OSNR acquiring unit 76 estimates the OSNR of the optical packet signal outputted from the EDF 75, based on the light power of the optical packet signal monitored by the monitor 72 and the noise figure of the EDF 75. A conventional method such as one disclosed in Japanese Patent Application Publication No. 2000-232433 may be used to estimate the OSNR based on the inputted light power and the noise figure.

The OSNR information generator 77 may convert the OSNR information estimated by the OSNR acquiring unit 76 into a format that can be appended to the optical packet signal. More specifically, a preamble is appended before the OSNR information. The optical signal generator 78 converts the signal generated by the OSNR information generator 77 into an optical signal so as to be outputted therefrom. This optical signal that has been generated by the OSNR information generator 77 will be hereinafter referred to as "OSNR signal" also. The OSNR signal is inserted before one of the branched-off optical packet signals bifurcated by the first optical coupler 71. The optical packet signal to which the OSNR signal has been appended is amplified by the EDF 75 before it is outputted from an output port OUT.

Figure 7A:
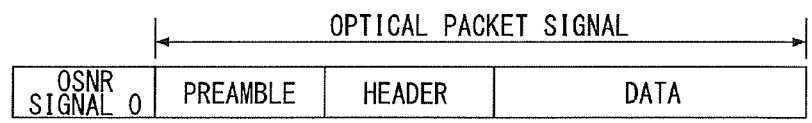
FIGS. 7A to 7C each shows an example of optical packet signal to which OSNR signal(s) is/are appended.
Figure 7B:
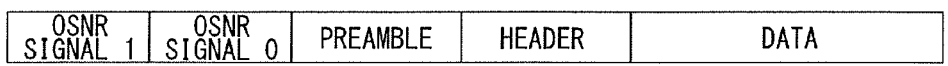
Figure 7C:

FIGS. 7A to 7C each shows an example of optical packet signal to which OSNR signal(s) is/are appended. FIG. 7A shows an optical packet signal sent from the optical switch transmitter. Each optical packet signal is constructed such that a header is provided before data and such that a preamble is provided before the header. Also, an OSNR signal 0 having OSNR information at the time an optical packet signal is transmitted is appended before the preamble of the optical packet signal.

FIG. 7B shows an optical packet signal that has passed through a first optical amplifier device 70. Once the optical packet signal has passed through the first optical amplifier device 70, an OSNR signal 1 having the OSNR information on the optical packet signal that has passed through the first optical amplifier device 70 is appended before the OSNR signal 0.

FIG. 7C shows an optical packet signal that has passed through a second optical amplifier device 70. Once the optical packet signal has passed through the second optical amplifier device 70, an OSNR signal 2 having the OSNR information on the optical packet signal that has passed through the second optical amplifier device 70 is appended before the OSNR signal 1. In this manner, an OSNR signal is appended before the optical packet signal every time the optical packet signal passes the optical amplifier device 70.

Figure 8:
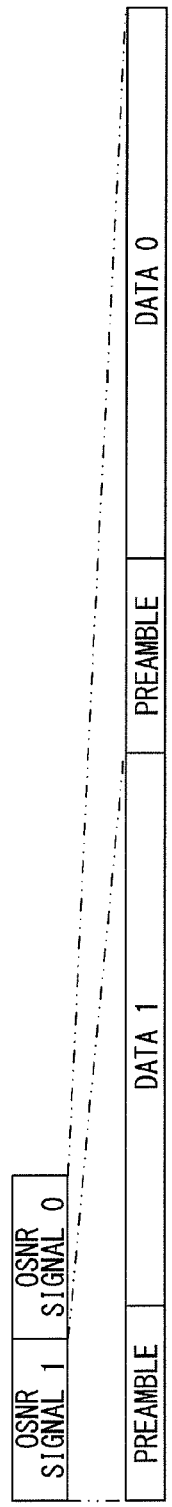
FIG. 8 is a diagram used to explain a construction of OSNR signal.

FIG. 8 is a diagram used to explain a construction of OSNR signal. As shown in FIG. 8, an OSNR signal N is constructed such that a preamble is provided before data N which is the OSNR information on the optical packet signal having passed through an Nth optical amplifier device 70. This is to ensure that the data N is receivable by a receiving network element.

If the optical amplifier device 70 as shown in FIG. 6 is used for an network element of the optical packet switching system 100 of FIG. 1, the OSNR acquiring unit will analyze the received optical packet signal and extract the OSNR signal appended to the beginning of the optical packet signal. Then the OSNR is obtained from the acquired OSNR signal. Since this OSNR is one appended by the optical amplifier device through which the optical packet signal has last passed, it may be regarded as the one closest to the actual OSNR of the received optical packet signal.

Figure 9:
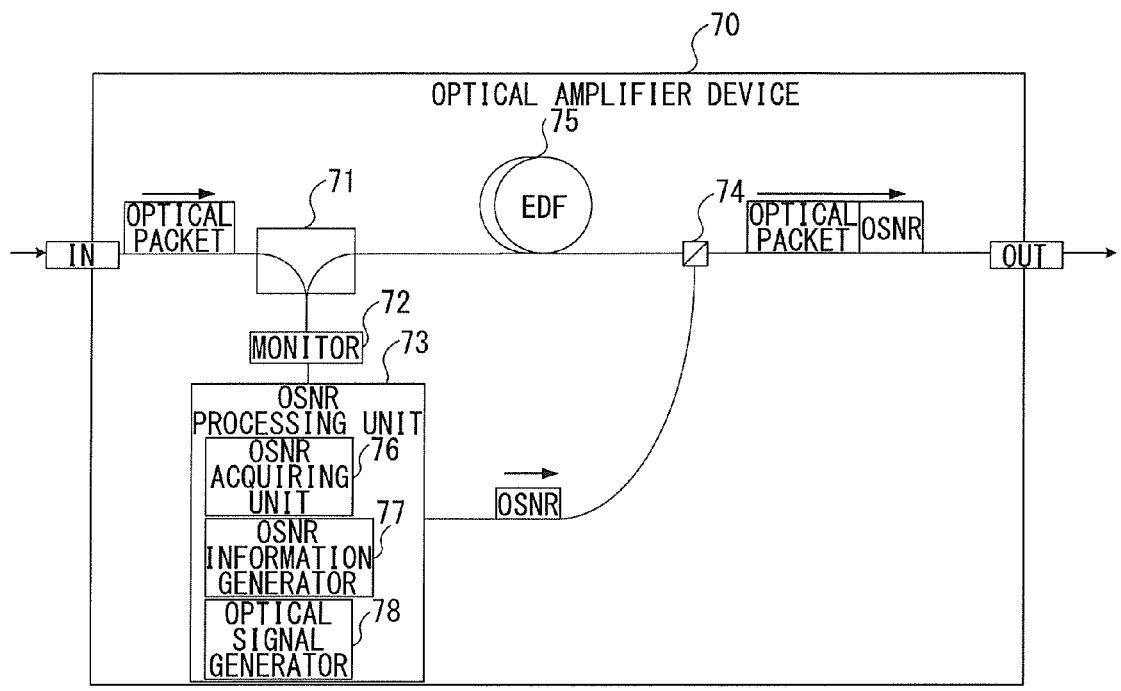
FIG. 9 shows a modification of an optical amplifier device.

FIG. 9 shows a modification of the optical amplifier device. An optical amplifier device 70 of FIG. 9 according to the modification differs from the optical amplifier device of FIG. 6 in that the OSNR signal is added after the optical packet signal has passed through the EDF 75.

In the above-described embodiment, the OSNR signal is appended before the preamble of the optical packet signal. In this case, even if the timing with which the OSNR signal is inserted is slightly delayed, the delayed OSNR signal will be overlapped with the preamble and therefore the delay will not adversely affect the data body of the optical packet signal. Nevertheless, the position where the OSNR signal is appended is not limited to the position before the optical packet signal and may be after the optical packet signal. In such a case, it is only necessary that the insertion timing of OSNR signal be precisely adjusted so that the OSNR signal does not overlap with the data body of the optical packet signal.

Figure 10A:
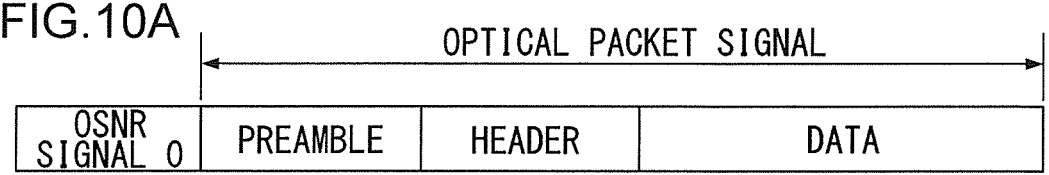
FIGS. 10A to 10C each shows another example of optical packet signal to which an OSNR signal is appended.
Figure 10B:
Figure 10C:
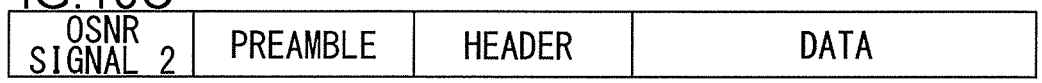

FIGS. 10A to 10C each shows another example of optical packet signal to which an OSNR signal is appended. In this example, the OSNR signal is rewritten every time the optical packet signal passes through a network element.

FIG. 10A shows an optical packet signal sent from the optical switch transmitter. As shown in FIG. 10A, an OSNR signal 0 having OSNR information at the time an optical packet signal is transmitted is appended before the preamble of the optical packet signal.

FIG. 10B shows an optical packet signal that has passed through a first network element. Once the optical packet signal has passed through the first network element, the OSNR signal 0 is rewritten to an OSNR signal 1.

FIG. 10C shows an optical packet signal that has passed through a second network element. Once the optical packet signal has passed through the second network element, the OSNR signal 1 is rewritten to an OSNR signal 2.

Figure 11:
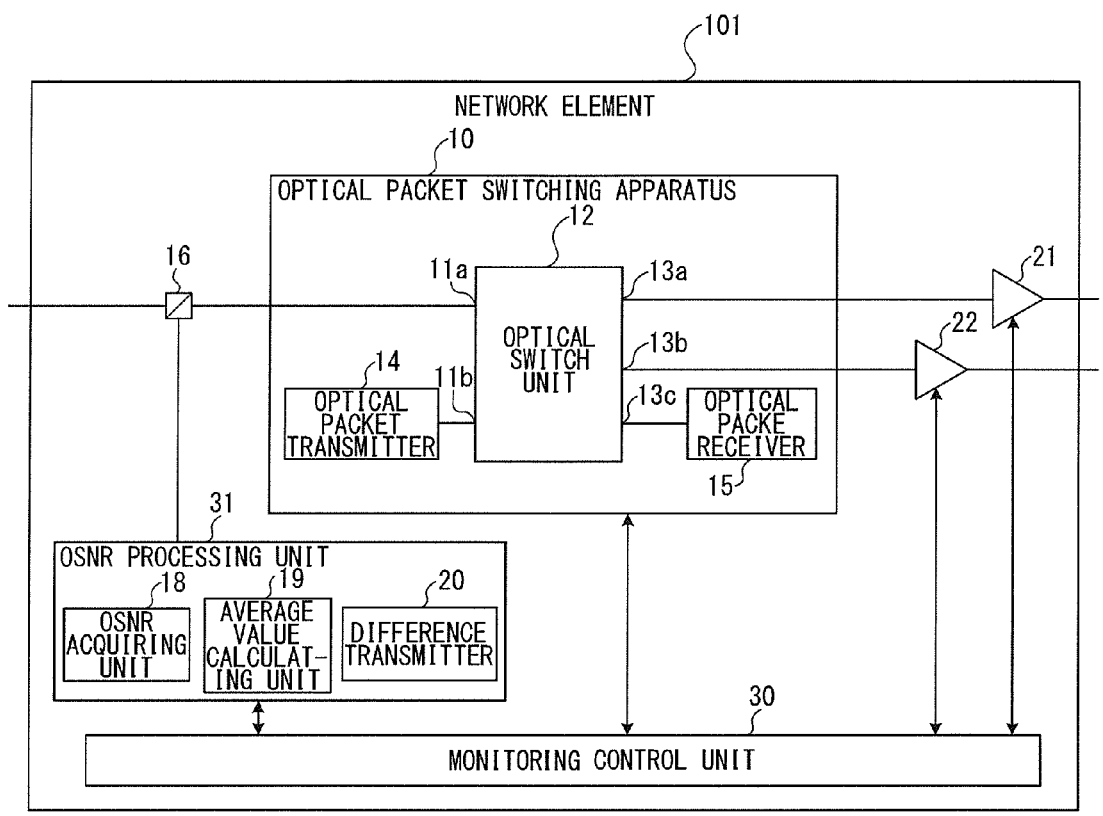
FIG. 11 shows a modification of a network element.

FIG. 11 shows a modification of a network element. As shown in FIGS. 10A to 10C, a network element 101 shown in FIG. 11 can rewrite the OSNR signal. The network element 101 according to this modification differs from the network element of FIG. 2 in that the OSNR processing unit 31 further includes an OSNR signal generator 79.

The OSNR signal generator 79 converts the OSNR information on the optical packet signal acquired by the OSNR acquiring unit 18 into an optical OSNR signal and then outputs the optical OSNR signal to an input port of the optical switch unit 12. The optical switch unit 12 adjusts the output timing of the optical packet signal and the OSNR signal so that the OSNR signal is outputted before the optical packet signal. The optical switch unit 12 controls an optical switch so that when the optical packet signal is switched, the OSNR signal appended to the optical packet signal at first is removed. As a result, the OSNR information to be appended to the optical packet signal can be rewritten to the most current information.

In the above description, the OSNR information is appended to the optical packet signal and then the optical packet signal with the OSNR information is conveyed to a network element located downstream but the OSNR may be conveyed using an optical supervisory channel.

In the optical packet switching system as shown in FIG. 1, communications using the optical supervisory channel are constantly performed between the network elements. The optical packet signals are switched based on the destination information appended to each of the optical packet signals. Thus the monitoring control unit of each network element is aware of the next network element to which the optical packet signal having certain packet information (i.e., source, destination, and packet ID) is to be transmitted. Accordingly, the packet information and the OSNR information can be sent to the next network element.

When, for example, a certain optical packet signal is to be switched in the optical packet switching apparatus 10A of the first network element 101A, the monitoring control unit 30A has the information concerning the next destination of said optical packet signal. That is, the monitoring control unit 30A is aware of as to whether said optical packet signal is next delivered to the second network element 101B or the third network element 101C. Thus, when said optical packet signal is switched to the second network element 101B, the monitoring control unit 30A can transmit the packet information on said optical packet signal and the OSNR information to the monitoring control unit 30B of the second network element 101B. Also, when said optical packet signal is switched to the third network element 101C, the monitoring control unit 30A can transmit the packet information on said optical packet signal and the OSNR information to the monitoring control unit 30C of the third network element 101C. In this manner, the information is conveyed in sequence, so that the OSNR information on the optical packet signal can be conveyed up to a receiving network element. In the receiving network element, the above-described control of suppressing the variation in OSNR can be performed using the OSNR information conveyed by the optical supervisory channel.

The present invention has been described based upon illustrative embodiments and modifications. The above-described embodiments are intended to be illustrative only and it will be obvious to those skilled in the art that various modifications to the combination of constituting elements and processes could be further developed and that such modifications are also within the scope of the present invention.

What is claimed is:

1. An optical packet switching system including a plurality of transmitting network elements for transmitting optical packet signals and a receiving network element for receiving the optical packet signals transmitted from the transmitting network elements, the receiving network element comprising:
    an optical signal-to-noise ratio (OSNR) acquiring unit configured to acquire an OSNR of each of the optical packet signals received;
    an average value calculating unit configured to calculate an average value of the OSNRs of optical packet signals received within a predetermined time duration for each of the plurality of transmitting network elements that are sources of the optical packet signals; and
    a difference information transmitter configured to calculate, for each of the plurality of transmitting network elements, a difference between the calculated average value thereof and an average value of the ONSRs of all of the optical packet signals received within the predetermined time duration, and configured to transmit the difference to a transmitting network element associated with the difference,
    wherein each of the transmitting network elements adjusts a characteristic of an optical packet signal to be transmitted in a manner such that the difference is reduced.

2. The optical packet switching system according to claim 1, wherein each of the transmitting network elements adjusts the light power and/or extinction ratio of the optical packet signal.

3. The optical packet switching system according to claim 1, wherein each of the transmitting network elements includes an optical amplifier device for amplifying the optical packet signal, estimating the ONSR of the optical packet signal, and appending information on the estimated OSNR to the optical packet signal.

4. The optical packet switching system according to claim 3, wherein the optical amplifier device estimates the OSNR of the optical packet signal to be outputted, based on the light power of the inputted optical packet signal and a noise figure of the optical amplifier device.

5. The optical packet switching system according to claim 3, wherein the optical amplifier device converts the estimated OSNR information into an optical signal and inserts the optical signal before or after the optical packet signal.

6. The optical packet switching system according to claim 1, wherein each of the transmitting network elements conveys information on the OSNR to the receiving network element using an optical supervisory channel.

* * * * *